(12) United States Patent
Matsumura et al.

(10) Patent No.: US 6,921,517 B2
(45) Date of Patent: Jul. 26, 2005

(54) PROCESS AND APPARATUS FOR THE PYROLYSIS OF HYDROCARBON GAS

(75) Inventors: Shuzo Matsumura, 38A Gloucester Walk, London (GB), W8 4HY; Masaji Yoneta, Tokyo (JP); Rokuro Denda, Tokyo (JP); Yoshito Umeda, Aichi (JP); Masao Hattori, Aichi (JP); Satoshi Hagi, Aichi (JP); Jun Funakoshi, Osaka (JP); Akira Kosaka, Osaka (JP)

(73) Assignees: Shuzo Matsumura, London (GB); The Japan Steel Works, Ltd., Tokyo (JP); Kubota Corporation, Osaka (JP)

( * ) Notice: Subject to any disclaimer, the term of this patent is extended or adjusted under 35 U.S.C. 154(b) by 462 days.

(21) Appl. No.: 10/011,785

(22) Filed: Dec. 11, 2001

(65) Prior Publication Data

US 2002/0039548 A1 Apr. 4, 2002

Related U.S. Application Data (62) Division of application No. 09/516,955, filed on Mar. 1, 2000, now abandoned.

(30) Foreign Application Priority Data

Feb. 2, 2000 (JP) .................................. P. 2000-025251

(51) Int. Cl.[7] .................................................. B01J 8/06
(52) U.S. Cl. ........................ 422/197; 422/198; 48/127.9
(58) Field of Search ........................... 48/62 R, 75, 89, 48/94, 127.9, 198.2, 198.6, 198.7, 214 R, 214 A; 422/188, 196, 197, 198, 200, 201, 202, 203, 211, 218

(56) References Cited

U.S. PATENT DOCUMENTS 2,548,759 A 4/1951 Allen
3,741,736 A 6/1973 Bockhorn et al.
4,044,068 A * 8/1977 Kurtz ........................... 585/636
4,599,479 A 7/1986 Okamoto et al.
4,672,144 A 6/1987 Green
5,583,240 A * 12/1996 Asher et al. .................... 554/98
5,674,301 A * 10/1997 Sakai et al. ..................... 48/61
5,841,011 A 11/1998 Hashimoto et al.

FOREIGN PATENT DOCUMENTS

| EP | 0 607 862 A | | 7/1994 | |
|---|---|---|---|---|
| JP | 63-84629 | * | 4/1988 | .............. B01J/8/06 |
| JP | 63-84630 | * | 4/1988 | .............. B01J/8/06 |
| JP | 2000080385 A | | 3/2000 | |

OTHER PUBLICATIONS

Database WPI Section Ch. Week 200026 Derwent Publications Ltd., London. GB: Class H04, AN 2000-296076 XP002185528 &JP 2000 080385 A Japan Steel Works Ltd. Mar. 21, 2000.

* cited by examiner

Primary Examiner—Kevin P. Kerns
(74) Attorney, Agent, or Firm—Sughrue Mion, PLLC

(57) ABSTRACT

A hydrocarbon gas to be decomposed, optionally mixed with water vapor, is allowed to flow through the gap between various porous tubes 4 constituting a group of porous tubes provided extending vertically in a decomposition reaction column 1 while air or oxygen is jetted homogeneously from the interior to the exterior of the porous tubes in the direction perpendicular to the stream of the hydrocarbon gas to be decomposed, optionally mixed with water vapor. The mixture is then ignited to form a diffusion flame layer B on the outer surface of the porous tubes 4. With the diffusion flame layer as a heat source, the hydrocarbon gas to be decomposed, optionally mixed with water vapor, undergoes pyrolysis.

12 Claims, 7 Drawing Sheets

FIG.1

HYDROCARBON GAS TO BE DECOMPOSED OR HYDROCARBON GAS TO BE DECOMPOSED WITH WATER VAPOR

SYNTHETIC GAS OR DECOMPOSED/ REFINED GAS

AIR OR OXYGEN

⬛⬇ HYDROCARBON GAS TO BE DECOMPOSED OR HYDROCARBON GAS TO BE DECOMPOSED WITH WATER VAPOR

⇦ SYNTHETIC GAS OR DECOMPOSED/ REFINED GAS

⇨ AIR OR OXYGEN

PROCESS AND APPARATUS FOR THE PYROLYSIS OF HYDROCARBON GAS

This is a divisional of application Ser. No. 09/516,955, filled Mar. 1, 2000, now abandoned; the disclosure of which is incorporated herein by reference.

BACKGROUND OF INVENTION

1. Field of Invention

The present invention relates to a process for pyrolyzing a hydrocarbon gas, optionally mixed with water vapor, to produce an olefin-based organic compound or a synthetic gas containing hydrogen or an olefin-based organic compound and an apparatus therefor.

2. Related Art

In order to produce a desired olefin-based organic compound (ethylene, acetylene, propylene, butene, etc.) from a paraffinic organic compound, it has heretofore been normally practiced to decompose a paraffinic organic compound having a long-chain chemical composition to an olefinic organic compound having a short-chain chemical composition through a pyrolysis apparatus.

As the foregoing pyrolysis apparatus there has been mainly used a type of pyrolysis apparatus arranged such that a gaseous paraffinic organic compound and water vapor are allowed to flow through a tube in a heating oven, whereby the tube is externally heated so that naphtha is pyrolyzed to produce an olefin-based organic compound.

Further, the olefin-based organic compound produced in the pyrolysis apparatus is transferred from the pyrolysis apparatus to a rapid cooling apparatus to be rapidly cooled therein.

The process to be conducted in the conventional pyrolysis apparatus requires heating to high temperature (from about 700° C. to 900° C.), unavoidably causing the rise in the facility cost and the coking of the interior of the tube. In order to inhibit coking, it is necessary that water vapor be allowed to flow through the tube together with the paraffinic compound.

Further, in the conventional equipment, the pyrolysis apparatus and the rapidly cooling apparatus are separately provided from each other. Thus, the equipment becomes too intricate, and in order to start the rapidly cooling apparatus, there is required the time of period from the pyrolysis a hydrocarbon gas, optionally mixed with water vapor.

SUMMARY OF INVENTION

An object of the invention is to provide a process for the pyrolysis of a hydrocarbon gas which requires no high temperature heating and thus can be effected at a reduced facility cost and undergoes no coking and an apparatus therefor.

Another object of the present invention is to provide an apparatus for the pyrolysis of a hydrocarbon gas for rapidly cooling the pyrolyzed gas to reduce the equipment cost and to increase a yielding ratio of useful gas.

In accordance with the invention, the foregoing object can be accomplished as follows. In other words, a hydrocarbon gas to be decomposed, optionally mixed with water vapor, is allowed to come in direct contact with air or oxygen to form a diffusion flame layer. The hydrocarbon gas is then allowed to undergo radical reaction with the diffusion flame layer as a heat source to produce an olefinic organic compound gas or a synthetic gas containing an olefinic organic compound.

In order to form the foregoing diffusion flame layer, a hydrocarbon gas to be decomposed, optionally mixed with water vapor, is allowed to flow uniformly through the gap between various porous tubes constituting a group of porous tubes extending vertically in a decomposition reaction column. Air or oxygen is then homogeneously jetted from the interior to the exterior of the porous tubes in the direction perpendicular to a stream of the hydrocarbon gas to be decomposed, optionally mixed with water vapor. The hydrocarbon gas to be decomposed, optionally mixed with water vapor, is then ignited to form a diffusion flame layer on the outer surface of the porous tubes. Alternatively, air or oxygen is allowed to flow uniformly through the gap between various porous tubes constituting a group of porous tubes extending vertically in a decomposition reaction column. A hydrocarbon gas to be decomposed, optionally with mixed water vapor, is supplied into the porous tubes. Air or oxygen is then homogeneously jetted from the exterior to the interior of the porous tubes in the direction perpendicular to a stream of a hydrocarbon gas to be decomposed, optionally mixed with water vapor.

Further, according to the present invention, the apparatus is provided with a gas rapidly cooing device adjacent to the pyrolysis portion having the porous tubes.

DETAILED DESCRIPTION OF PREFERRED EMBODIMENTS

Modes for carrying out the invention will be described hereinafter with reference to the following examples in connection with the drawings.

First Embodiment

Figure 1:
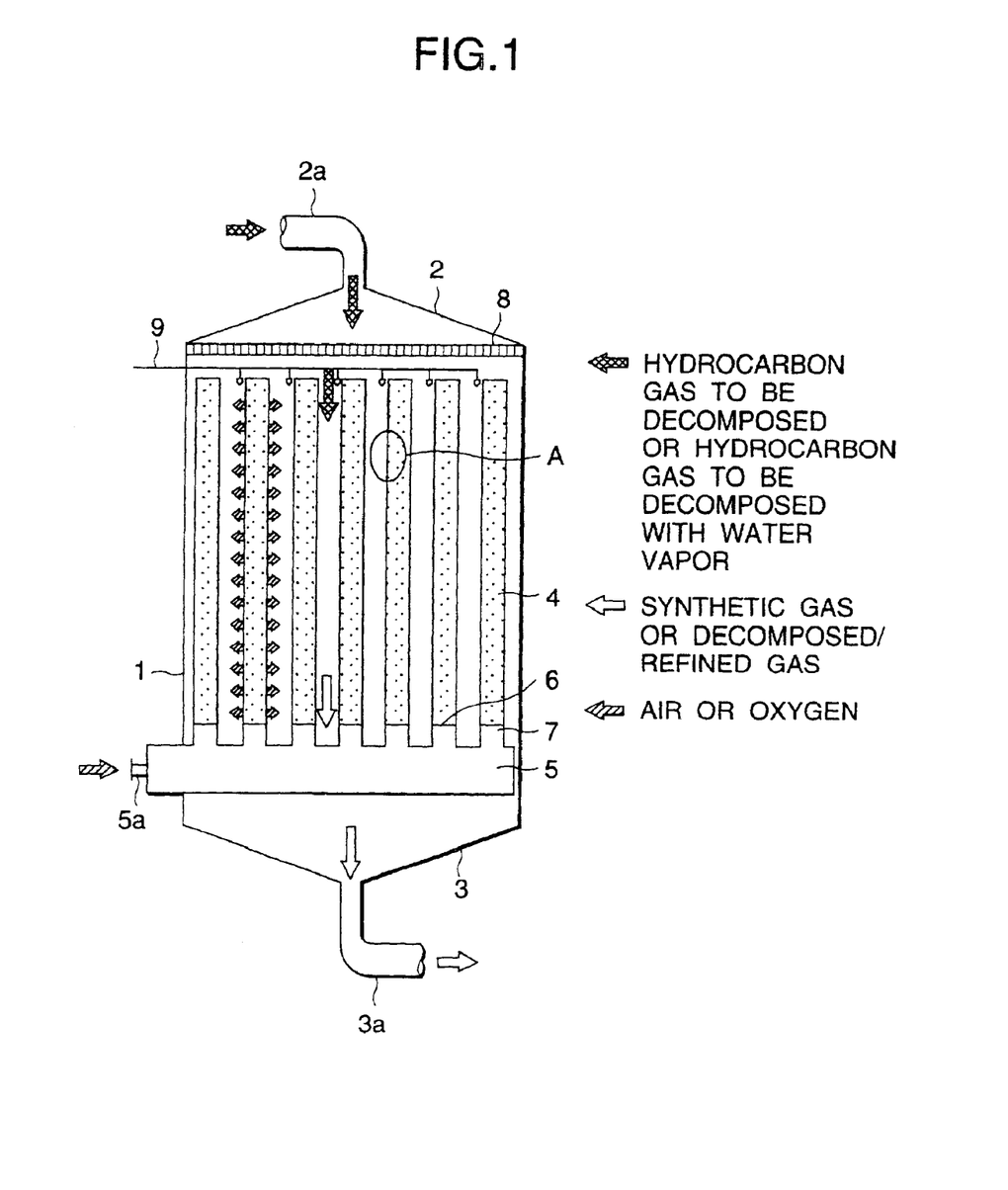
FIG. 1 is a diagram illustrating the concept of the apparatus for the pyrolysis of a hydrocarbon gas according to the first example of the invention.

FIG. 1 is a diagram illustrating the concept of an apparatus for the pyrolysis of a hydrocarbon gas according to the first example of the invention. In this diagram, the reference numeral 1 indicates a decomposition reaction column comprising a diffuser 2 provided at the upper portion thereof and a reducer 3 provided at the lower portion thereof. Provided extending vertically in the decomposition reaction column 1 are a group of porous tubes. The reaction column may be cylindrical or prismatic.

The various porous tubes constituting the foregoing group of porous tubes are each made of a porous metal or a metal film material having a pore size of the order of MF (microfiltration) or UF (ultrafiltration). As the porous metal or metal film material there may be used SUS, tool steel, inconnel, titanium alloy, aluminum alloy or the like.

The various porous tubes constituting the foregoing group of porous tubes are each made of a porous metal or a metal film material having a pore size of the order of MF (microfiltration) or UF (ultrafiltration). As the porous metal or metal film material there may be used SUS, tool steel, Inconel, titanium alloy, aluminum alloy or the like.

Provided at the lower end of the diffuser 2 and above the group of porous tubes is a distributor 8. Provided in the gap between the outer surface of the upper portion of the various porous tubes 4 is an ignition system 9.

The diffuser 2 is provided with an inlet 2a through which a hydrocarbon gas to be decomposed such as paraffin gas, optionally mixed with water vapor, is supplied into the decomposition reaction column 1. The reducer 3 is provided with an outlet 3a through which a gas such as olefinic gas obtained by decomposition and purification is discharged out of the decomposition reaction column 1. The header 5 is provided with a nozzle 5a through which air or oxygen is supplied into the decomposition reaction column 1.

The operation of the decomposition reaction column 1 will be described hereinafter.

A hydrocarbon gas to be decomposed, optionally mixed with water vapor, is supplied into the decomposition reaction column 1 through the inlet 2a, rectified through the distributor, and then allowed to flow downward from the upper portion of the reaction column 1 uniformly through the gap between the various porous tubes 4.

Separately, air or oxygen which has been supplied into the reaction column 1 through the supply nozzle 5a is then jetted homogeneously out of the porous tubes through the pores in the porous metal material in the direction perpendicular to the stream of the hydrocarbon gas to be decomposed, optionally mixed with water vapor, due to the difference in pressure between inside and outside the porous tubes.

Figure 2:
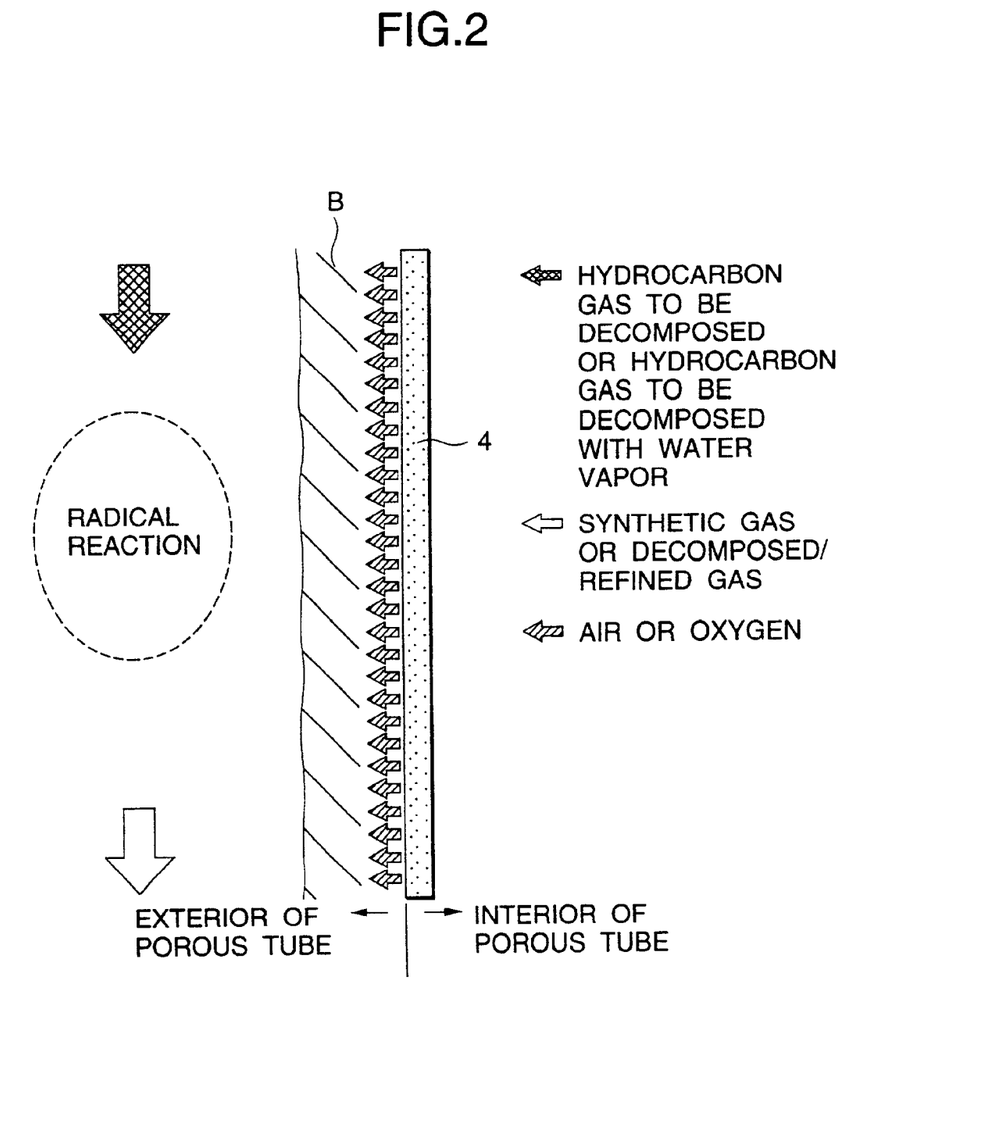
FIG. 2 is an enlarged view of Portion A of FIGS. 1 and 3.

When the gaseous mixture is ignited by the ignition system 9 under these conditions, a diffusion flame layer B is then formed on the outer surface of the porous tubes 4 as shown in FIG. 2. With this diffusion flame layer as a heat source, the hydrocarbon gas to be decomposed, such as paraffinic gas, optionally mixed with water vapor, undergoes radical reaction (free radical reaction) to produce a gaseous olefinic organic compound having a shorter chain chemical composition or a synthetic gas containing hydrogen, methane, carbon monoxide and a gaseous olefinic organic compound having a shorter chain chemical composition.

Second Embodiment

Figure 3:
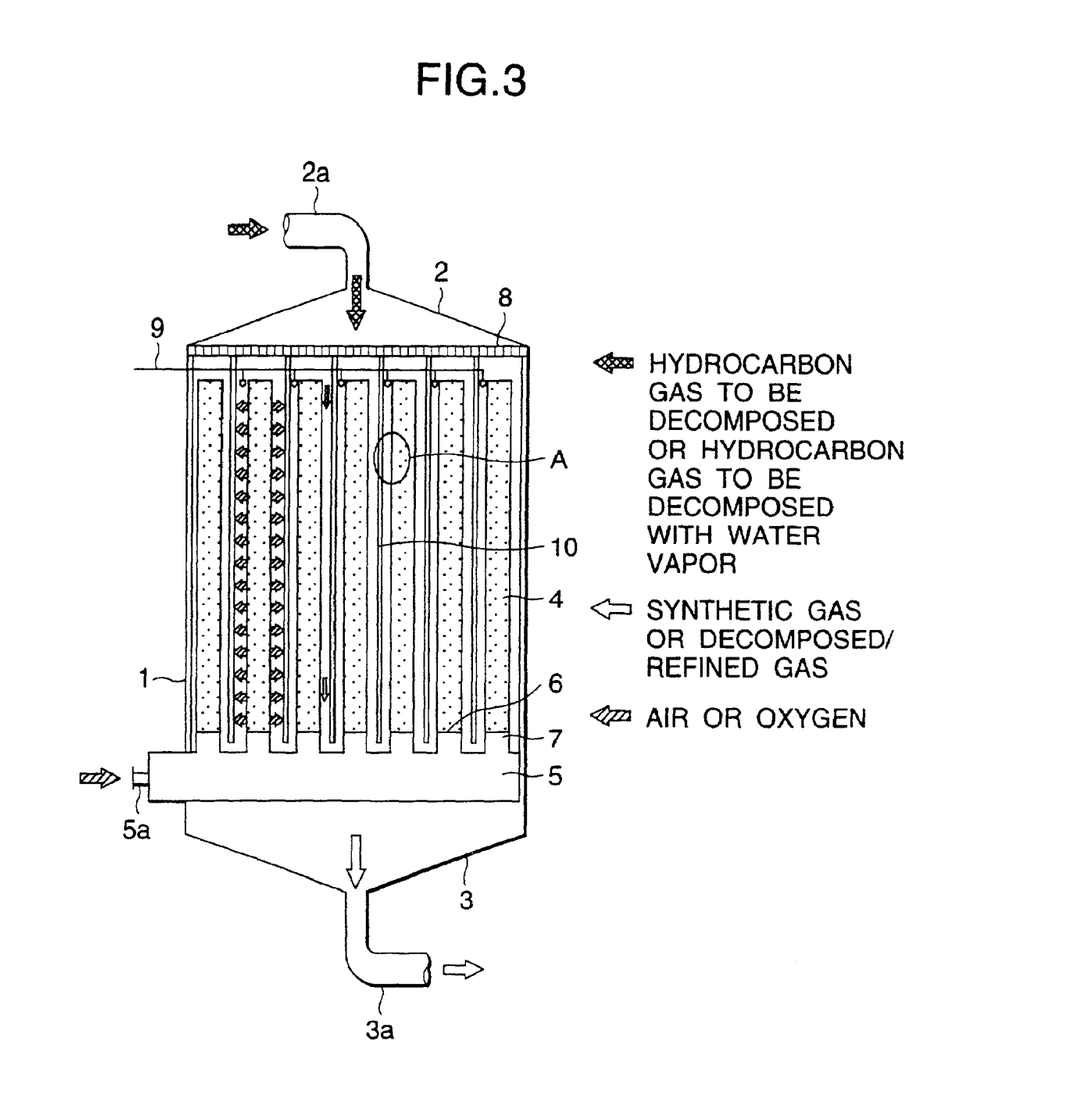
FIG. 3 is a diagram illustrating the concept of the apparatus for the pyrolysis of a hydrocarbon gas, optionally mixed with water vapor, according to the second example of the invention.
Figure 4:
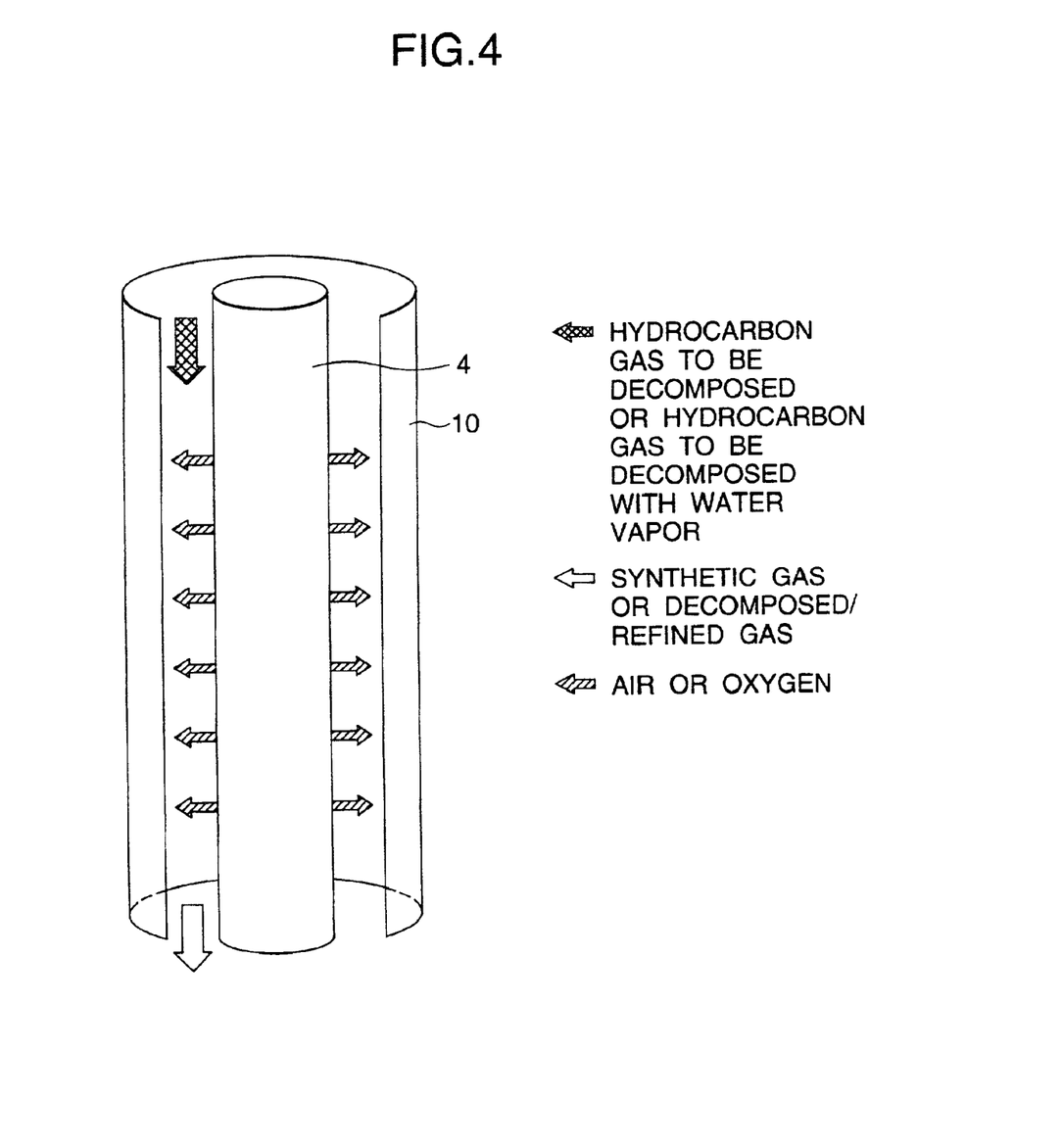
FIG. 4 is a partially sectional enlarged view of the double tube portion of FIG. 3.

FIG. 3 is a diagram illustrating the concept of an apparatus for the pyrolysis of a hydrocarbon gas according to the second example of the invention. Since the present example differs from the first example only in that non-porous tubes 10 are provided concentrically of the porous tubes 4 surrounding the periphery of the porous tubes 4, respectively, with a gap interposed therebetween, the description of other structures will be omitted. In some detail, as shown in FIG. 4, air is allowed to flow through the inner tube of a double tube consisting of the porous tube 4 as an inner tube and the non-porous tube 10 as an outer tube while a hydrocarbon gas to be decomposed, optionally mixed with water vapor, is allowed the flow space (double tube portion) defined by the inner tube and the outer tube, whereby the hydrocarbon gas to be decomposed undergoes radical reaction as in the first example to produce a gaseous olefinic organic compound having a shorter chain chemical composition or a synthetic gas containing hydrogen, methane, carbon monoxide and a gaseous olefinic organic compound having a shorter chain chemical composition.

In accordance with the foregoing example, air or oxygen is allowed to flow from the interior of the porous tubes 4 to the exterior of the porous tubes 4 while a hydrocarbon gas to be decomposed, optionally mixed water vapor, is allowed to flow along the exterior of the porous tubes 4. However, a hydrocarbon gas to be decomposed, optionally mixed with water vapor, is allowed to flow the interior of the porous tubes 4 while air or oxygen may be allowed to flow from the exterior of the porous tube 4 to the interior of the porous tubes 4.

Figure 5:
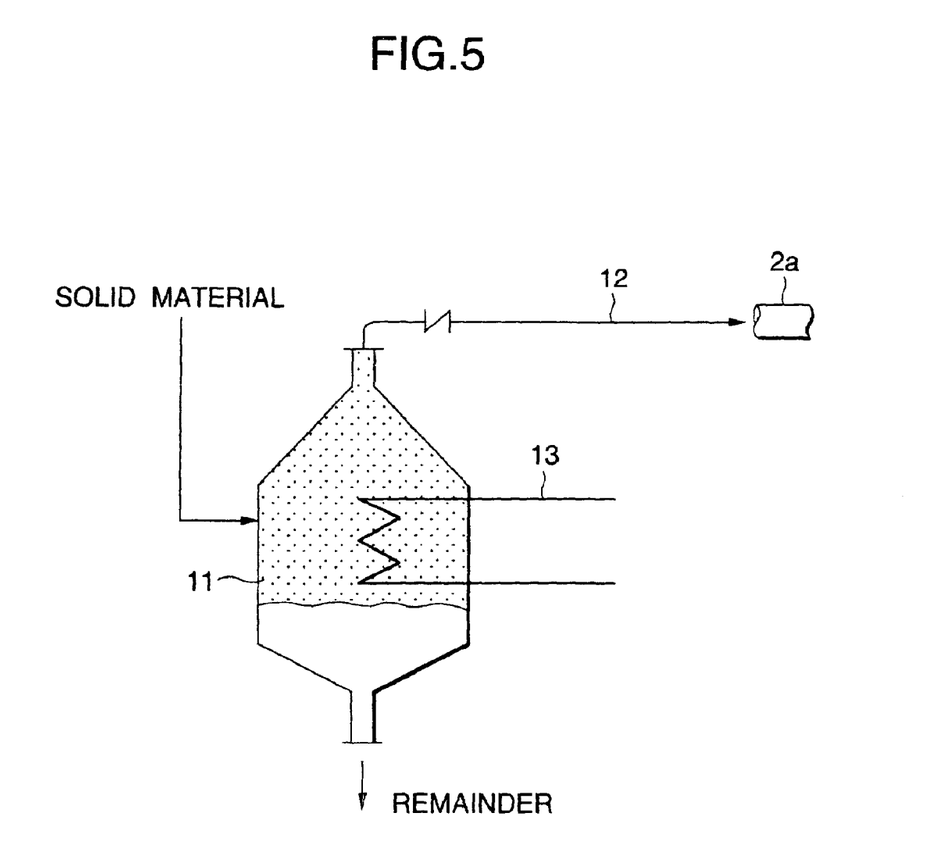
FIG. 5 is a diagram illustrating the solid starting material gasification apparatus connected to the pyrolysis apparatus according to the invention.

Further, in accordance with the foregoing example, a hydrocarbon gas to be decomposed, optionally mixed with water vapor, is supplied into the decomposition reaction column 1. As shown in FIG. 5, however, a gas produced by a process which comprises supplying a solid starting material such as waste plastic into a gasification apparatus 11 where it is then heated by a heating device 13 to decompose to a gas and a residue, and decomposed gas may be applied into the reaction column 1 through a pipe 12 to the inlet 2a.

Moreover, in accordance with the foregoing example, the decomposition reaction column 1 is provided with the inlet 2a at the upper portion thereof and the outlet 3a at the lower portion thereof. However, the decomposition reaction column 1 may be provided with the inlet 2a at the lower portion thereof and the outlet 3a at the upper portion thereof.

Third Embodiment

Figure 6:
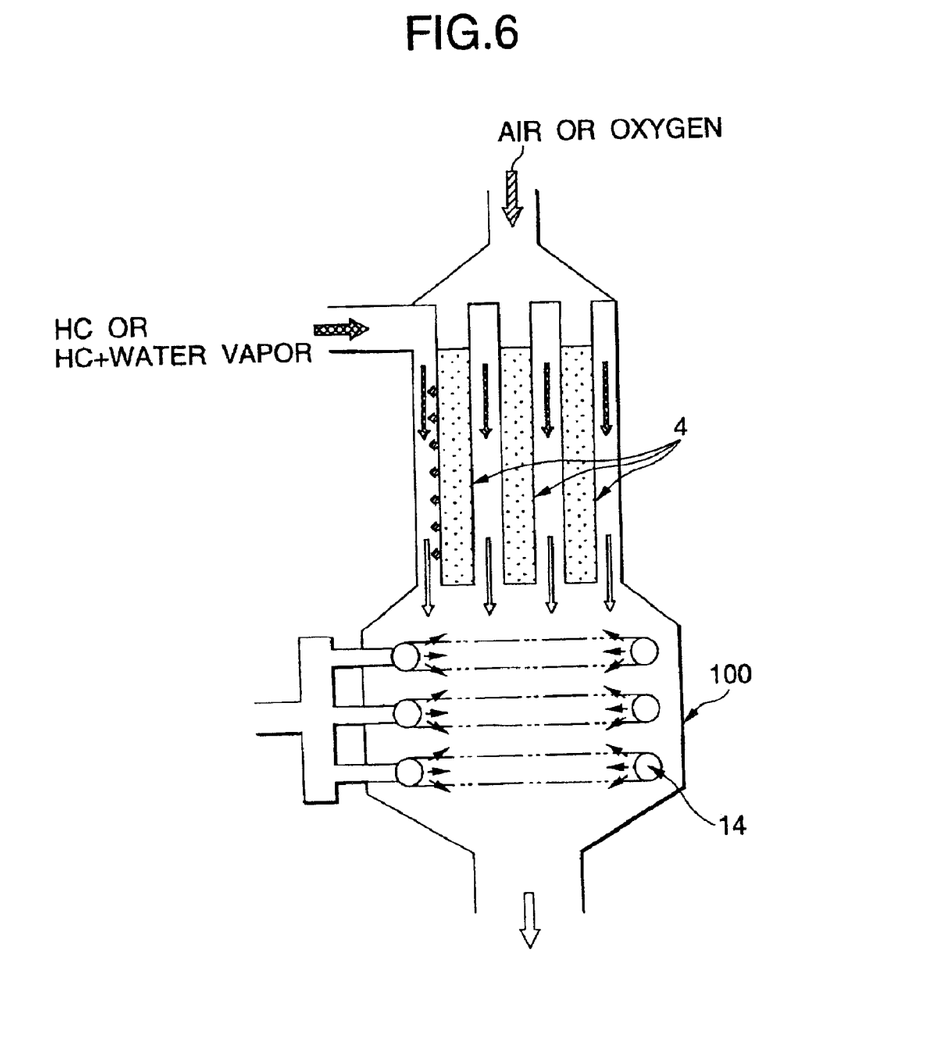
FIG. 6 is a diagram illustrating the concept of the apparatus for the pyrolysis of a hydrocarbon gas with a gas rapidly cooling column according to the third example of the invention.

FIG. 6 is a diagram illustrating the concept of an apparatus for the pyrolysis of a hydrocarbon gas according to the third example of the invention. In this embodiment, the upper portion of reaction column is the same as the structure described in the first embodiment, and the lower portion corresponds to the gas rapidly cooling column 100 for the pyrolyzed gas produced in the upper portion. Coolant spraying tubes 14 are arranged along an inner peripheral portion of the gas rapidly cooling column 100.

The operation of this device will be described hereinafter.

Figure 7:
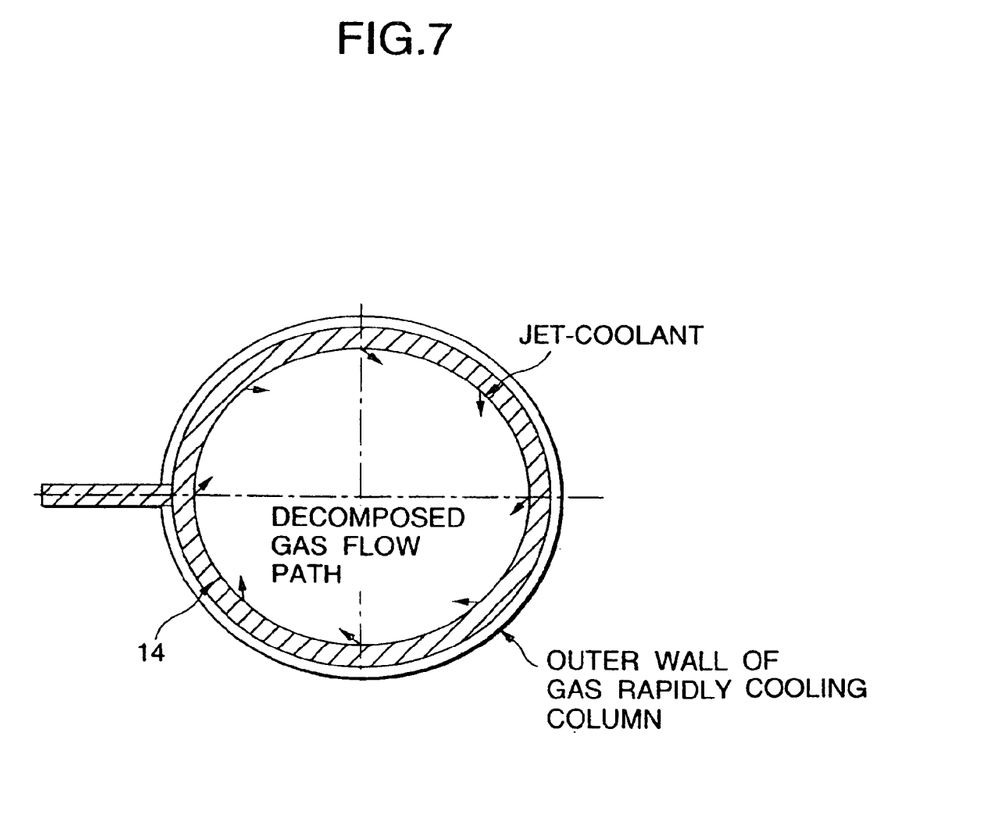
FIG. 7 is a plan view of a gas rapidly cooling portion of apparatus for pyrolysis of a hydrocarbon gas shown in FIG. 6.

The pyrolyzed gas produced in the reaction column as shown in FIG. 1 is transferred directly from the reaction column 1 to the gas rapidly cooling column 100. A coolant sprays from a slit or a spraying hole provided on the coolant spray tubes toward the gas flow path in such a manner that the coolant sprays slantly with respect to the center of a gas cooling portion to meet the spiral air flow in the gas rapidly cooling portion. The coolant spray tubes 14 are arranged in the gas rapidly cooling column 100 to rapidly cool the gas produced in the upper portion of the reaction column 1.

Unlike the foregoing conventional decomposition process and apparatus, the pyrolysis process and apparatus according to the invention is characterized by a process which comprises allowing a hydrocarbon gas obtained by he evaporation of naphtha or the like, optionally mixed with water vapor, to come in direct contact with air or oxygen to form a diffusion flame layer, and then allowing the mixture to undergo radical reaction with the diffusion flame layer as a heat source. By using the process and apparatus of the invention, a desired olefin-based organic compound gas or a synthetic gas containing hydrogen, methane, carbon monoxide and an olefin-based organic compound gas having a short chain chemical composition can be produced without a high temperature and pressure process, making it possible to reduce the facility cost and avoid coking.

Further, in use of a radical reaction, after radical reaction, the reacted gas is rapidly cooled to increase yield of the synthetic gas to be desired.

What is claimed is:

1. An apparatus for pyrolyzing a hydrocarbon gas comprising:
    a decomposition reaction column comprising a diffuser at the upper portion of said reaction column and a reducer provided at the lower portion of said reaction column;
    a group of porous tubes extending vertically in said reaction column; and
    a header connected to the lower end of said porous tubes for supplying air or oxygen into said porous tubes; and which is provided with a nozzle through which air or oxygen is supplied into the decomposition reaction column and the other end of said porous tubes are blocked;
    wherein said diffuser is provided with an inlet for supplying a hydrocarbon gas, optionally mixed with water vapor, into the decomposition reaction column and said reducer is provided with an outlet through which an olefinic gas is discharged from the decomposition reaction column; and
    wherein an ignition system is provided for forming a diffusion flame layer on the outer surface of said porous tubes, which serves as a heat source for allowing hydrocarbon gas to undergo a radical reaction.

2. The apparatus for pyrolyzing a hydrocarbon gas according to claim 1, wherein a non-porous tube is provided concentrically outside of said porous tubes surrounding the periphery of said porous tubes.

3. The apparatus for pyrolyzing a hydrocarbon gas according to claim 2, wherein a distributor is provided at the inlet side of said decomposition reaction column.

4. The apparatus for pyrolyzing a hydrocarbon gas according to claim 3, wherein said hydrocarbon gas is replaced by a synthetic gas obtained by the pyrolysis of waste plastic.

5. The apparatus for pyrolyzing a hydrocarbon gas according to claim 3 further comprising:
    gas cooling portion for rapidly cooling the pyrolyzed gas, said gas cooling portion directly connected to said decomposition reaction column.

6. The apparatus for pyrolyzing a hydrocarbon gas according to claim 2, wherein said hydrocarbon gas is replaced by a synthetic gas obtained by the pyrolysis of waste plastic.

7. The apparatus for pyrolyzing a hydrocarbon gas according to claim 2 further comprising:
    gas cooling portion for rapidly cooling the pyrolyzed gas, said gas cooling portion directly connected to said decomposition reaction column.

8. The apparatus for pyrolyzing a hydrocarbon gas according to claim 1, wherein a distributor is provided at the inlet side of said decomposition reaction column.

9. The apparatus for pyrolyzing a hydrocarbon gas according to claim 8, wherein said hydrocarbon gas is replaced by a synthetic gas obtained by the pyrolysis of waste plastic.

10. The apparatus for pyrolyzing a hydrocarbon gas according to claim 8 further comprising:
    gas cooling portion for rapidly cooling the pyrolyzed gas, said gas cooling portion directly connected to said decomposition reaction column.

11. The apparatus for pyrolyzing a hydrocarbon gas according to claim 1, wherein said hydrocarbon gas is replaced by a synthetic gas obtained by the pyrolysis of waste plastic.

12. The apparatus for pyrolyzing a hydrocarbon gas according to claim 1 further comprising:
    gas cooling portion for rapidly cooling the pyrolyzed gas, said gas cooling portion directly connected to said decomposition reaction column.

* * * * *